(12) United States Patent
George et al.

(10) Patent No.: US 10,747,464 B2
(45) Date of Patent: Aug. 18, 2020

(54) EFFICIENT DATA TRANSMISSION TECHNIQUES

(71) Applicant: EMC IP Holding Company LLC, Hopkinton, MA (US)

(72) Inventors: Subin George, Framingham, MA (US); Deepak Vokaliga, Hopkinton, MA (US); Jaeyoo Jung, Shrewsbury, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 19 days.

(21) Appl. No.: 16/170,384

(22) Filed: Oct. 25, 2018

(65) Prior Publication Data

US 2020/0133553 A1    Apr. 30, 2020

(51) Int. Cl.
*G06F 3/06* (2006.01)
(52) U.S. Cl.
CPC .......... *G06F 3/0647* (2013.01); *G06F 3/0608* (2013.01); *G06F 3/0673* (2013.01)
(58) Field of Classification Search
CPC .................................................... G06F 3/0647
See application file for complete search history.

(56) References Cited

U.S. PATENT DOCUMENTS

| 9,727,368 | B1* | 8/2017 | Tsirkin | G06F 9/45558 |
| 2014/0310493 | A1* | 10/2014 | Pace | G06F 3/0647 |
| | | | | 711/165 |
| 2014/0380006 | A1* | 12/2014 | Maeda | G06F 3/0683 |
| | | | | 711/162 |
| 2017/0262221 | A1* | 9/2017 | Zhao | G06F 3/0647 |
| 2018/0018340 | A1* | 1/2018 | Shitara | G06F 3/0604 |

* cited by examiner

*Primary Examiner* — Kevin Verbrugge
(74) *Attorney, Agent, or Firm* — Muirhead and Saturnelli, LLC

(57) ABSTRACT

Techniques for migrating data of a logical device from a source to a target system may include: obtaining a map indicating unused data portions of a logical device; issuing read commands from the target system to the source system to only read data from the source copy of the logical device for logical addresses that are not marked in the map as unused data portions; receiving the read data at the target system; writing the read data to second logical addresses of the target copy of the logical device on the target system; and marking logical addresses indicated by the map as corresponding to the unused data portions. The source system may also determine whether all data of a received read request that reads data from the logical device is included in an unused data portion and if so, return no read data and a specialized error condition.

20 Claims, 10 Drawing Sheets

EFFICIENT DATA TRANSMISSION TECHNIQUES

BACKGROUND

Technical Field

This application generally relates to data transmission such as, for example, data migration.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of migrating data comprising: obtaining, by a target system from a source system, a map indicating unused data portions stored at first logical addresses of a logical address range of a logical device, wherein data of the logical device is being migrated from a source copy of the logical device on the source system to a target copy of the logical device on the target system; issuing one or more read commands from the target system to the source system to read data from the source copy of the logical device, wherein the one or more read commands only read data from second logical addresses of the logical device that are not marked as unused data portions in accordance with the map; receiving the read data at the target system from the source system; responsive to receiving the read data stored at the second logical addresses of the logical device, writing the read data to second logical addresses of the target copy of the logical device on the target system; and marking the first logical addresses indicated by the map as corresponding to the unused data portions. The map may be a bitmap including a plurality of entries, wherein each of the plurality of entries may correspond to a different logical address of the logical device and may include a zero (0) if said each entry corresponds to a logical address of the logical device of an unused data portion and otherwise may include a one (1). Unused data portions on the source copy of the logical device and on the target copy of the logical device may be denoted by zeroes stored at logical address subranges of the logical address range, wherein the logical address subranges may be associated with the unused data portions. The method may include sending, from the target system to the source system, a command inquiring whether the source system supports any one or more modes of migrating data from the source system to the target system; and responsive to receiving the command at the source system, sending a response to the target system identifying one or more supported modes of migrating data, if any, supported by the source system. The method may include sending from the target system to the source system a second command notifying the source system whether the target system supports a specialized error condition used in connection with one of the supported modes of migrating data. The target system may not issue reads to read data for the second logical addresses of the unused data portions and wherein said marking may indicate that a predetermined pattern or value is stored at the second logical addresses. The predetermined pattern or value may be zeroes stored at the second logical addresses. The method may include receiving, on the source system from the target system, the one or more read commands that read data from the source copy of the logical device; performing, by the source system, first processing for each of the one or more read commands, the first processing including: determining whether all data requested by said each read command is included in an unused data portion; and responsive to determining all data requested said each read command is included in an unused data portion, performing second processing by the source system including: returning, to the target system, a response to said each read command with no read data payload and an error condition indicating that a subrange of the logical address space read by said each read command is an unused data portion. The method may include responsive to determining all data requested by said each read command is not included in an unused data portion, returning, to the target system, a response to said each read command with a data payload of read data stored at a subrange of the logical address space read by said each read command.

In accordance with another aspect of techniques herein is a computer readable medium comprising code stored thereon that, when executed, performs a method of migrating data comprising: issuing a plurality of reads from the target system to the source system, wherein each of the plurality of reads reads data from a different subrange of a logical address space of a source copy of a logical device stored on the source system, wherein data of the logical device is being migrated from a source copy of the logical device on the source system to a target copy of the logical device on the target system; receiving, on the source system, the plurality of reads; performing, by the source system, first processing for each of the plurality of reads comprising: determining whether all data requested by said each read is included in an unused data portion; and responsive to determining all data requested said each read is included in an unused data portion, performing second processing by the source system including: returning, to the target system, a response to said each read with no read data payload and an error condition indicating that a subrange of the logical address space read by said each read is an unused data portion. The method may include receiving, at the target system, the response to said each read; and marking the subrange of the logical address space of said each read as an unused data portion. The method may include responsive to determining all data requested by said each read is not included in an unused data portion, returning, to the target system, a response to said each read with a data payload of read data stored at a subrange of the logical address space read by said each read. The method may include writing, at the target system, the read data to the subrange of the logical address space on the target copy of the logical device.

In accordance with another aspect of techniques herein is a system comprising: a processor; and a memory comprising code stored thereon that, when executed, performs a method of migrating data comprising: obtaining, by a target system from a source system, a map indicating unused data portions stored at first logical addresses of a logical address range of a logical device, wherein data of the logical device is being migrated from a source copy of the logical device on the source system to a target copy of the logical device on the target system; issuing one or more read commands from the target system to the source system to read data from the source copy of the logical device, wherein the one or more read commands only read data from second logical addresses of the logical device that are not marked as unused data portions in accordance with the map; receiving the read data at the target system from the source system; responsive to receiving the read data stored at the second logical addresses of the logical device, writing the read data to second logical addresses of the target copy of the logical device on the target system; and marking the first logical addresses indicated by the map as corresponding to the unused data portions. The map may be a bitmap including a plurality of entries, wherein each of the plurality of entries may correspond to a different logical address of the logical device and may include a zero (0) if said each entry corresponds to a logical address of the logical device of an unused data portion and otherwise may include a one (1). Unused data portions on the source copy of the logical device and on the target copy of the logical device may be denoted by zeroes stored at logical address subranges of the logical address range, wherein the logical address subranges may be associated with the unused data portions. The method may include sending, from the target system to the source system, a command inquiring whether the source system supports any one or more modes of migrating data from the source system to the target system; and responsive to receiving the command at the source system, sending a response to the target system identifying one or more supported modes of migrating data, if any, supported by the source system. The method may include sending from the target system to the source system a second command notifying the source system whether the target system supports a specialized error condition used in connection with one of the supported modes of migrating data. The target system may not issue reads to read data for the second logical addresses of the unused data portions and wherein said marking may indicate that a predetermined pattern or value is stored at the second logical addresses. The predetermined pattern or value may be zeroes stored at the second logical addresses.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
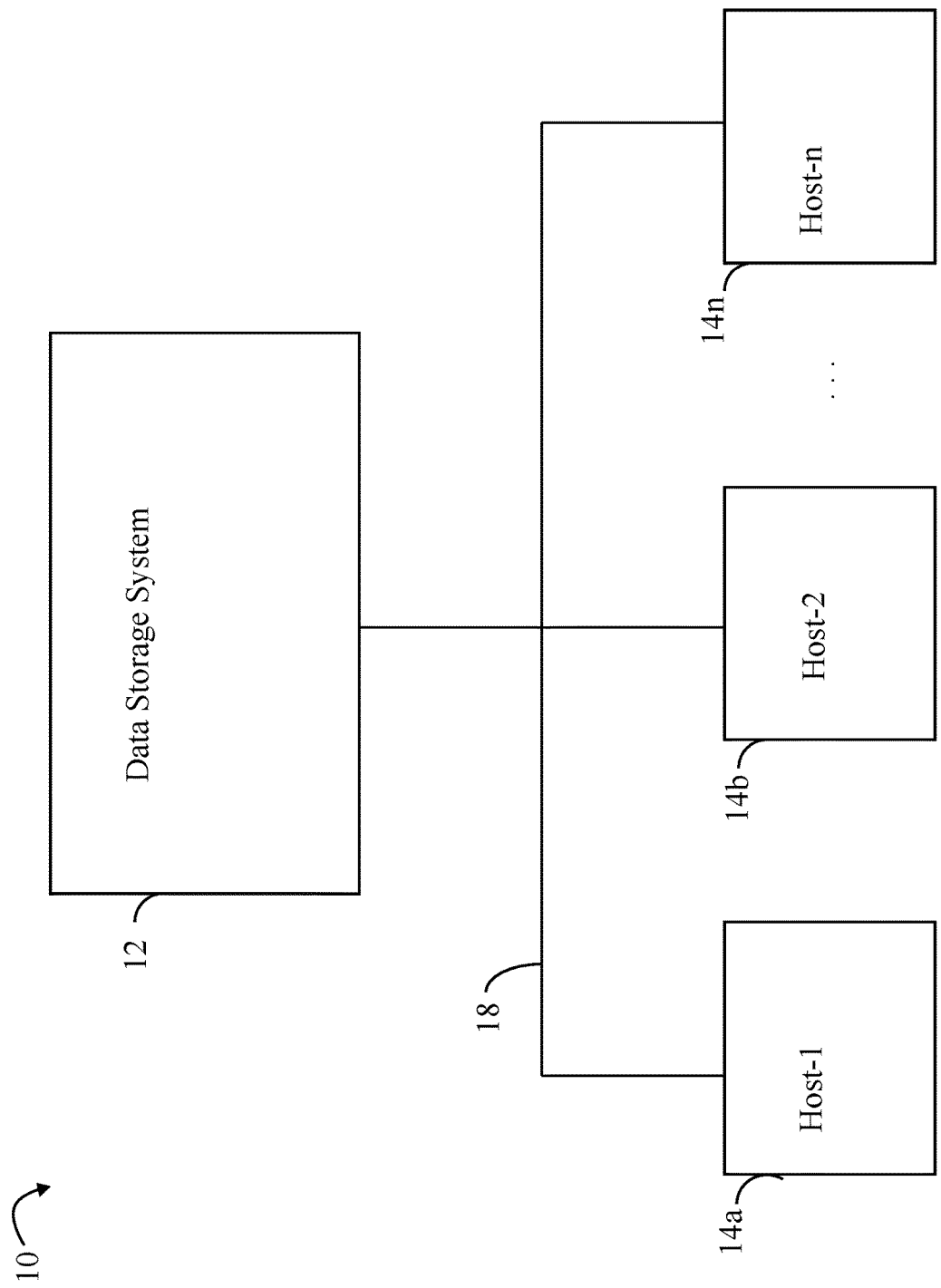
FIGS. 1 and 3 are examples of embodiments of systems and components that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Dell EMC™ PowerMAX™ data storage system, as well one or more other data storage systems as may vary with the embodiment.

Figure 2A:
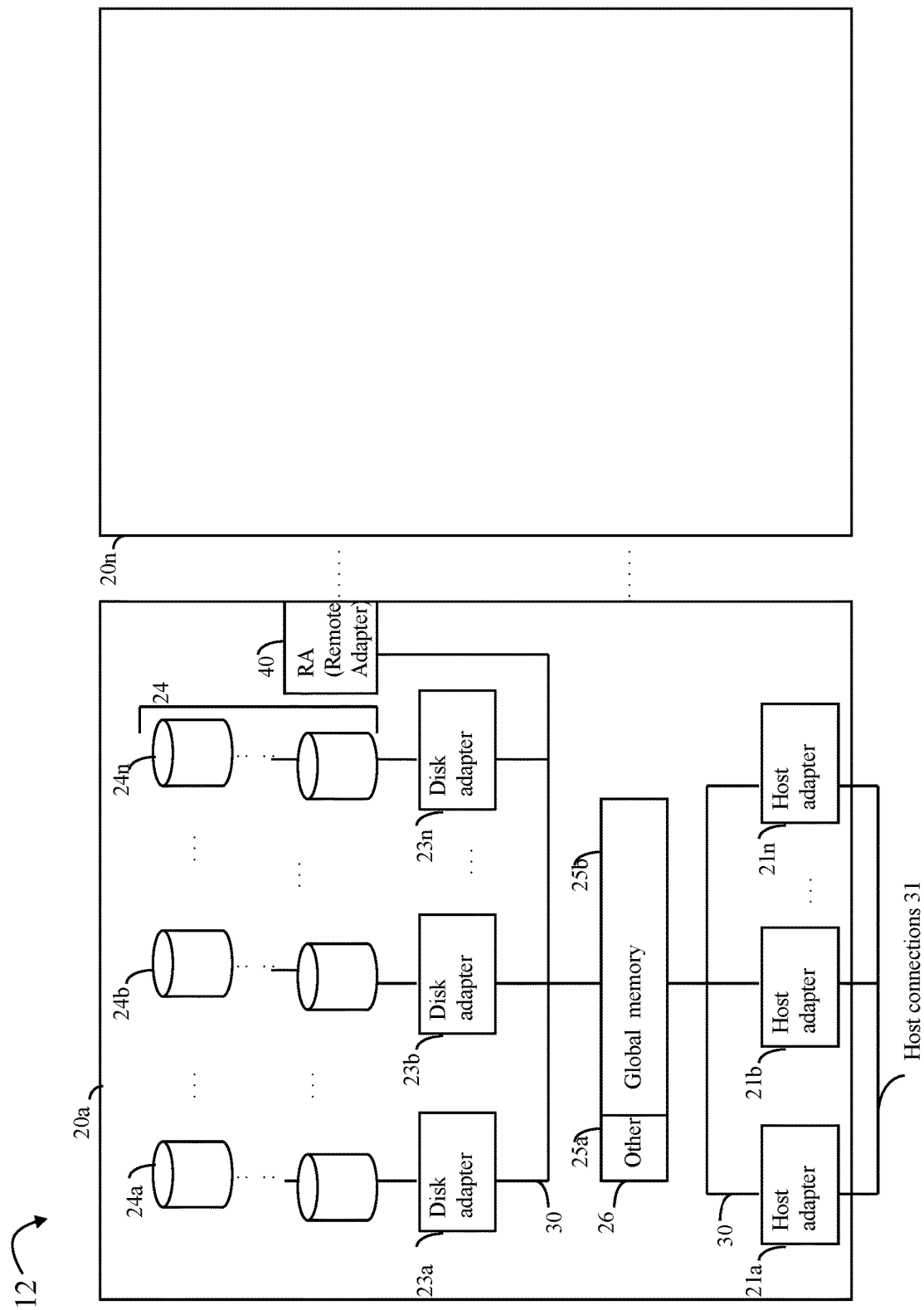
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as a data storage array, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems. For example, in an embodiment, the storage systems 20a-20n may each include one or more Remote Data Facility (RDF) adapter units 40. An RDF product may be used to copy data from one storage system to another. For example, if a host writes data to a first storage system (e.g., a local storage system), it may be desirable to copy that data to a second storage system provided in a different location (e.g., a remote storage system). The RAs of two data storage systems, such as 20a and 20n, may communicate over an RDF link (not illustrated) between the two data storage systems to transfer data between the two data storage systems. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor.

Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Figure 2B:
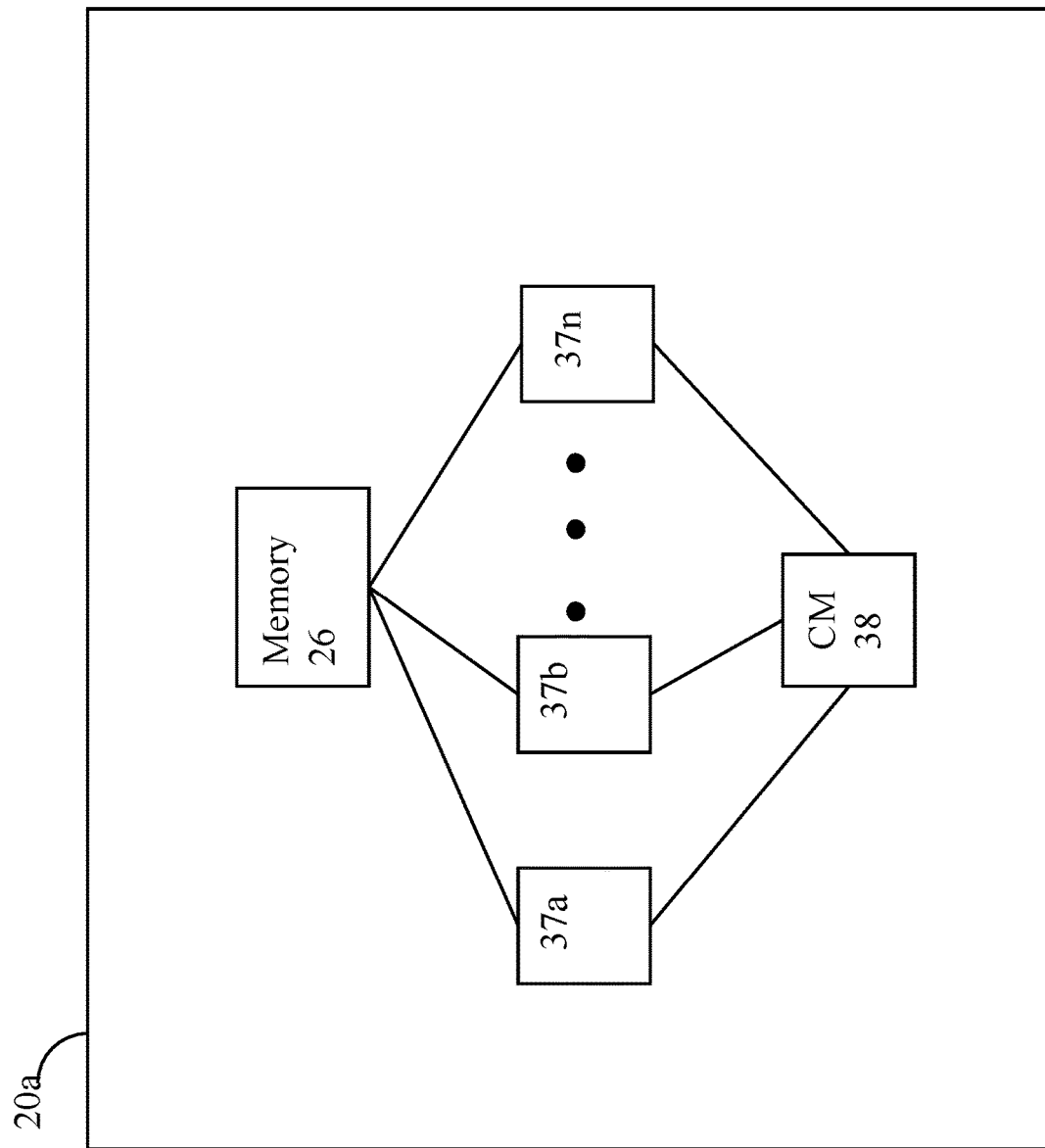
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
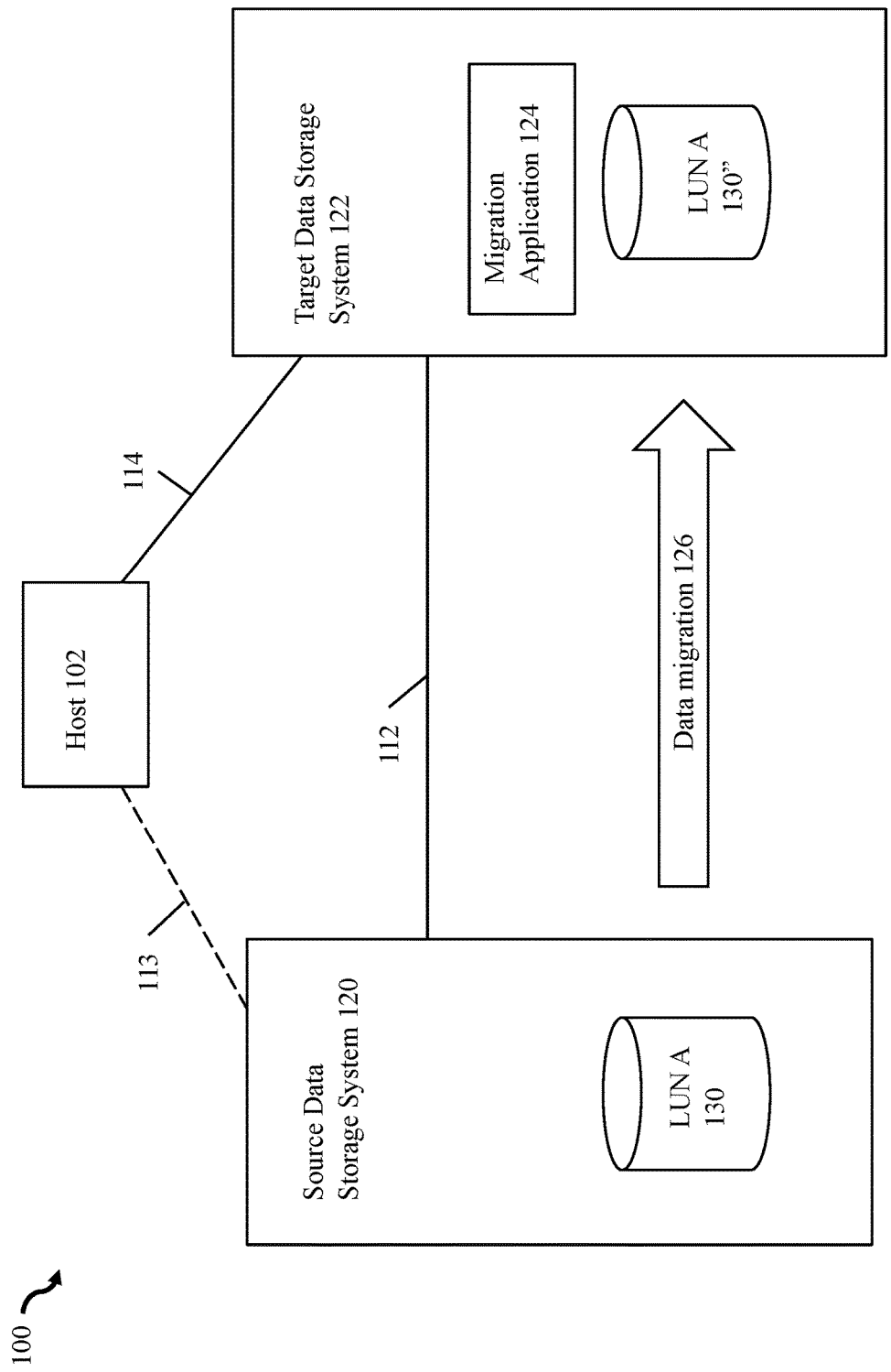

Referring to FIG. 3, shown is an example of an embodiment of a system that may be utilized in connection with techniques herein. The example 100 includes a host 102, communication connections 112, 113 and 114, and data storage systems 120, 122. Element 120 may denote a source data storage system (also sometimes referred to as source system) from which data is being migrated to a target data storage system 122 (also sometimes referred to as target system). The example 100 illustrates components at a point in time during the process of migrating data of LUN A 130 from source data storage system 120 to LUN A 130" of the target data storage system 122. Connection 112 between the data storage systems 120 and 122 is used for communications therebetween. For example, connection 112 may be used for transmitting data that is migrated from the source data storage system 120 to the target data storage system.

Element 126 denotes the general direction of the data migration.

To further illustrate, element 130 may denote a source instance of LUN A on the source data storage system 120 which is being migrated to the target data storage system 122 by transmitting data of LUN A 130 over connection 112. Element 130" may denote a target instance of LUN A on the target data storage system 122. The migration process (controlled by the migration application 124 in this example) copies data from the source instance of LUN A 130 to its corresponding target instance LUN A 130" on target data storage system 122. It should be noted that to the host 102, LUN A 130 and LUN A 130" may be viewed and configured for access by the host 102 as the same LUN A over 2 different connections. Prior to the migration, the host 102 may access (e.g., issue I/Os to) LUN A 130 of the source data storage system 120 over connection 113. In the example 100, the connection 130 is illustrated as a dashed line to denote that connection 113 may no longer be configured for use whereby the host 102 is no longer able to issue I/Os to LUN A 130 over connection 113. Rather, at the point in time illustrated by the example 100 during the migration, the host 102 may issue I/Os to LUN A 130" over connection 114 to the target data storage system 122. In this particular example, the migration application 124 controlling the migration of LUN A 130 to LUN A 130" may be executing on the target data storage system 122. The migration application 124 may pull the data being migrated from the source data storage system 120 whereby the requested data is transmitted over connection 112 to the target data storage system 122.

In the example 100, the host 102 may be accessing LUN A 130" over connection 114, such as by issuing read and/or write I/Os to LUN A 130" while the data is being migrated from LUN A 130 of the source data storage system to LUN A 130" of the target data storage system 122. As a result, the host 102 may issue an I/O, such as read I/O, over connection 114 to read data from LUN A which has not yet been migrated to the target instance, LUN A 130" from the source instance, LUN A 130. In such a case, responsive to receiving the host read I/O for read data of LUN A that has not yet been migrated to the target data storage system 122, the target data storage system 122 may issue a request to copy (e.g., read I/O) the requested read data from the source instance, LUN A 130 of source data storage system 120, to the target instance, LUN A 130" of the target data storage system. The request to copy the read data may be characterized as an "on-demand" read request driven by the host 102's read I/O whereby the requested read data may be copied or migrated from system 120 to 122 out of order or out of a typical migration order. For example, the read I/O from the host 102 may read the last logical address or block of LUN A while the migration application 124 is copying the data from the source instance LUN A 130 to the target instance LUN A 130" in sequential order of LUN A's logical addresses. The migration application 124 may have only copied the first logical address or block's data of LUN A when the read I/O from the host 102 is received whereby the migration application 124 now migrates or copies the requested last logical address or block of LUN A 130 out of sequential logical address order in order to be able to service the requested read data to the host 102. Retrieving the requested read data on demand has a performance impact, for example, on the amount of time it takes to service the read I/O from the host 102.

Logical devices, such as LUN A 130 and 130", may be overprovisioned and may be configured to be larger than what may be needed at the time of creation in order to accommodate for future expected storage needs. For example, LUN A 130 may be initially configured to have a larger logical address space for storing data than needed at the time when LUN A 130 is created or initially configured. The foregoing of creating or configuring a logical device to be larger than what may actually be needed at the time of creation may be performed in order to account for expected future storage needs and efforts to minimize and avoid the need to later reconfigure the logical device to have a larger storage capacity. Thus, at the point in time when LUN A 130 is being migrated to LUN A 130", it may be that large portions of the LUN A 130 may have never been written to and/or have been reclaimed through storage space reclamation techniques. For example, such large portions of LUN A 130 may have a predetermined pattern, such as all "zeroes", to denote portions of the LUN A which have either never been written to, or otherwise have been reclaimed using a storage space reclamation technique. Storage space reclamation techniques are known in the art and may be performed to reclaim storage space of devices that may have been written to or accessed at a prior point in time but are now considered as "unused" for storing data. For example, if it has been at least a specified minimum amount of time since particular portions of the logical device have been accessed, such portions may be reclaimed and considered unused data portions of the logical device. As another example, some systems may allow for a user, administrator, and the like, to explicitly designate or identify specific portions of one or more logical devices as unused whereby a space reclamation technique may mark such portions and associated logical address ranges as unused. Thus, reclamation techniques may identify such unused portions of logical devices and mark such portions with a predetermined pattern, such as all "zeroes".

In this manner, at least one embodiment in accordance with techniques herein may generally denote unused storage or unused data portions of a logical device by marking such storage/data portions with a predetermined pattern, such as all zeroes (e.g. zero data values or content).

During migration, such as when migrating LUN A 130 of the source data storage system 120 to LUN A 130" of the target data storage system 122, the entire configured logical address space or entire configured storage capacity of LUN A 130, including the unused portions, may be copied and migrated to the target system 122. Thus, the migration application 124 may unnecessarily migrate and issue read requests to the source system 120 for such unused portions, such as those marked with zeroes or other predetermined pattern denoting the unused data portions. In connection with the migration application 124, and more generally the target data storage system 122 controlling the migration, the target data storage system 122 may be unaware of the unused data portions of the LUN A 130 that are marked, for example, with zeroes as zero-space ranges denoting unused data portions. Thus, the migration application 124 typically copies all data of LUN A 130 for the entire storage capacity or logical address space of LUN A 130 by issuing reads to the source data storage system 120. The source data storage system 120 may then service those reads by returning the requested read data, including returning data content of the unused data portions marked as zeroes/storing zeroes as their data content. Thus, when the migration application reads the unused data portions, in an embodiment not using techniques herein, the migration application reads all zeroes or zero data read payload for all such unused data portions.

It may be desirable to generally perform such migration or other application copying the desired data from system 120 to system 122 in a more efficient manner by avoiding or eliminating the transmission of the unused data portions. It should be noted that although the foregoing problem is described in connection with an ongoing migration whereby the host 102 is allowed to issue I/Os during the migration, a similar problem generally exists in connection with "offline" or cold migrations where the host 102 or other client is not allowed to issue I/Os to the LUN A (e.g., over connection 113 and/or 114) being migrated during the migration. Generally, it may be desirable to reduce, eliminate or avoid copying such unused data portions in connection with any suitable application where such data transmitted, migrated, replicated or copied from system 120 to system 122 is an unused data portion, such as of a configured logical device.

Described in following paragraphs are migration techniques which may be used to avoid transmitting such zero data payloads associated with unused data portions. Such techniques may be used in an embodiment where both the source data storage system 120 and target data storage system 122 support such techniques as described herein. In at least one embodiment in accordance with techniques herein, once the source instances of the one or more logical devices (e.g., LUN A 130) are "frozen" or no longer modified on the source data storage system (e.g., host no longer issues I/Os to the source instance LUN A 130 on source data storage system 120), the target data storage system may read from the source data storage system a map denoting which portions of the logical address space of the one or more logical devices being migrated are unused data portions. In such a first embodiment in which the unused data portions of a logical device are marked as having a content of zeroes stored thereon, the target data storage system may read a map for the logical device from the source data storage system where the map identifies those portions of the logical device's logical address space that are unused data portions (e.g., identities those data portions or logical address of the address space that are zeroes). In at least one embodiment, the map may be a bitmap (also sometimes referred to herein as a zeroes bitmap) including a different bit for each logical block or address space unit of the logical device. A bit of the bitmap associated with a particular logical address, such as a particular logical block of the logical device may, for example, have a value of 1 to denote that the particular logical block is used or not an unused data portion; and may otherwise have a value of 0 to denote that the particular logical block is unused/included in an unused data portion (e.g., is marked with zeroes in the data content or value stored). In at least one embodiment, the target data storage system may issue a request to the source data storage system to read a zeroes bitmap for a particular subrange of the logical device's logical address space. Thus, the target system may issue multiple requests each to retrieve a zeroes bitmap for a different subrange of the logical device's logical address space. In such an embodiment, the target data storage system may read the zeroes bitmap for at least a subrange of the logical device address space from the source data storage system. Subsequently, the target data storage system may issue read requests to migrate data selectively only for those data portions at logical addresses marked as used or non-zero (e.g., having an associated bit in the bitmap with a value of 1). The target data storage system may accordingly mark those logical addresses indicated by the bitmap as unused data portions whereby the target data storage system does not issue read requests for any data of unused data portion and rather marks such unused data portions of the logical device as having zeroes/zero content. In this manner, the target data storage system may implicitly or explicitly store zero data payload at the unused data portions of the target instance of the logical device on the target system 122 without issuing read requests to obtain data content for such unused data portions (e.g., target data storage system implicitly determines using the map that unused data portions have zero values stored as the data content by the indication in the bitmap having bit values of 0 for such unused data portions). In this manner, an embodiment in accordance with techniques herein may avoid transmitting (from the source system 120 to the target system 122) zero payload data transfers in the migration for unused data portions.

As another second example of an embodiment of techniques herein that is a variation of the foregoing, the target data storage system may send read commands to the source data storage system to read the entire logical address space of the source instance of the logical device (e.g., LUN A 130). For example, the target system 122 may issue multiple reads each reading a different subrange the logical address space of LUN A 130 on the source system 120. For a particular read request reading a specified logical address subrange of LUN A 130, if the subrange is all zeroes/has zero data value stored as the content (e.g., denotes only an unused data portion with no logical address thereof being a used data portion of the subrange), the source system 122 may not return a read data payload with all zeroes for the data content with a length of the subrange (e.g., do not send zeroes as the data payload). Rather, the source system 122 may alternatively return no read data (e.g., read data has zero payload length) and will send/return a specialized, vendor unique check condition to the target system 122. This specialized check condition may include a key or value indicator denoting the particular return information condition that the requested read data of the specified subrange is actually all zeroes and an unused data portion (e.g., zero data payload, zero data values or content stored in the entire specified subrange). The foregoing of returning the specialized check condition and a zero length read payload may be performed in an embodiment in accordance with techniques rather than returning an all zero data payload with zeroes as the data content/value stored for the specified address range. Description herein may refer to a check condition being returned from the source system 120 to the target system 122 in an embodiment in accordance with the SCSI standard. More generally, an embodiment may use any suitable command, return value, error condition, and the like, to return an indicator to the target system regarding the no read payload and that the requested read data is all zeroes/denotes an unused data portion. Once the target system has issued reads for the entire logical address space of the LUN A 130, the target system may again reissue the reads to the source system for the entire logical address space of LUN A 130 as a check to ensure proper identification of LUN A 130's unused data portions and used data portions. In at least one embodiment, when the read for the subrange of the logical address is not all zeroes and thereby includes both used and unused data portions, the source system 120 may simply return the requested read data to the target system 122. Thus in at least one embodiment, when a read issued for a subrange that includes a mix of used and unused data portions, the source system 120 may return the requested read data where the read payload data includes zeroes for the unused data portions.

In connection with the foregoing, the first embodiment described above and elsewhere herein in which the target system requests and obtains a zeroes bitmap may be implemented as a first mode of operating in accordance with techniques herein and the second latter embodiment described above and elsewhere herein may be implemented as a second mode of operating in accordance with techniques herein. The source and/or data storage systems may support just the first mode, just the second mode, or both the first and second modes. Thus, the target system 122 and source system 120 in an embodiment in accordance with techniques herein may operate using both the first and second modes of operation depending on what is supported by both the source system 120 and target system 122.

It should be noted that in at least one embodiment described in following paragraphs, a logical address subrange may be denoted as unused or never written to by having a predetermined pattern, such as a data value of zeroes, stored at the logical address subrange. Additionally, other conditions may also be possible causing the logical address subrange to have the predetermined pattern or value (e.g., such as zeroes for the data value) denoting the unused data portion. For example, one or more writes may have been issued that actually wrote the predetermined pattern or data value of zeroes to the logical address subrange. In such case in at least one embodiment in accordance with techniques herein, processing may handle all such logical address subranges having a data value of zeroes as unused data portions in order to have the source system 120 avoid transmission of zero data values for such logical address subranges (e.g., responsive to reads issued from the target to the source system for such logical address subranges of a LUN that is being migrated). As a variation, an embodiment may further modify or adapt the description herein to distinguish between an unused data portion that was not actually ever written to from a data portion that has a zero data value as a result of actual host or client writes of zeroes. For example, in such an embodiment, additional metadata for the LUN may denote or distinguish an unused data portion not ever written to from a data portion having a zero data value as a result of a host or client writing zeroes. In such a variation, the unused data portions as described herein may not include those data portions having the predetermined pattern or value, such as all zeroes, resulting from a host or client writing the predetermined pattern or value.

The foregoing and other aspects of techniques herein are described in more detail in following paragraphs.

Figure 4:
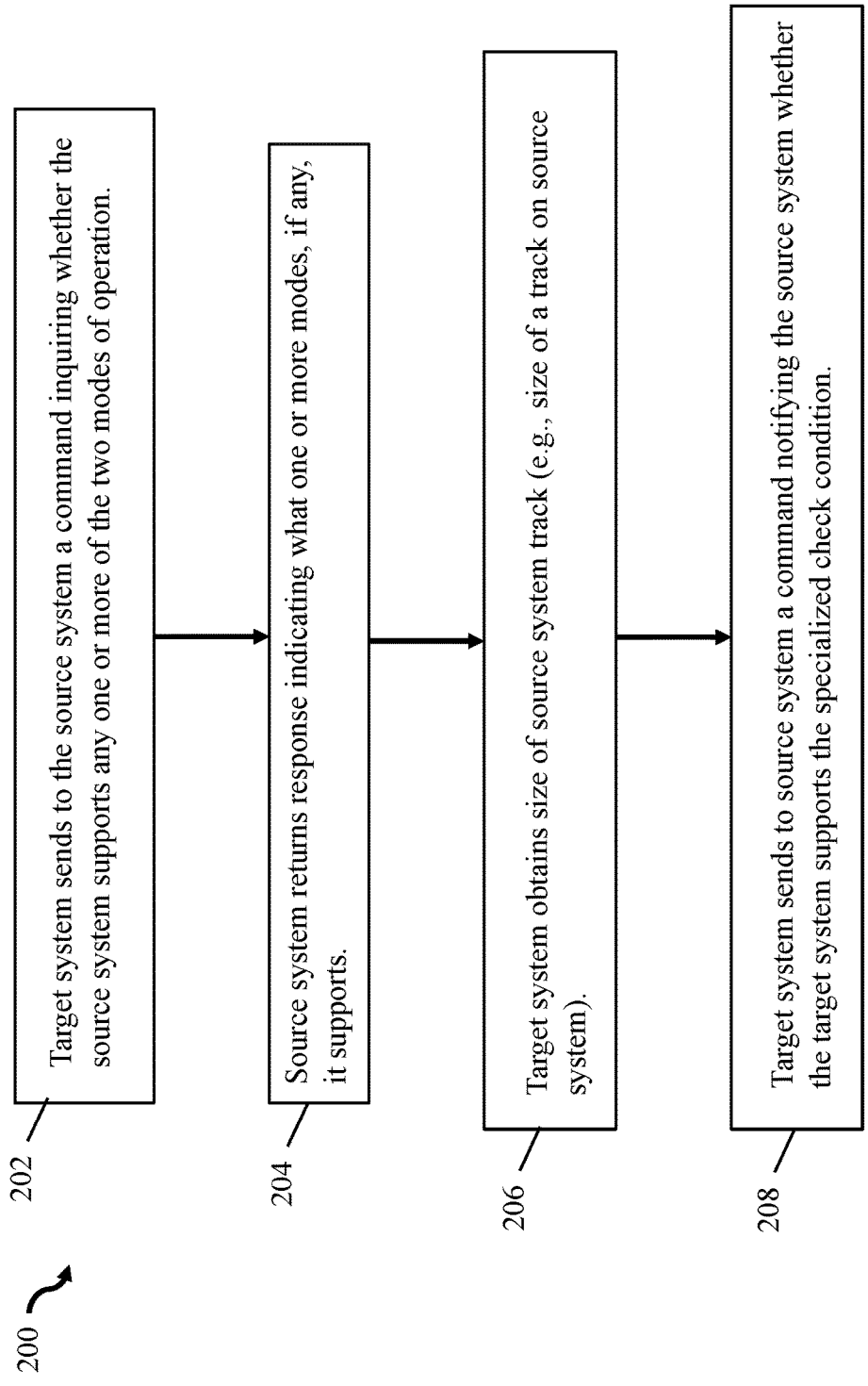
FIGS. 4, 5, 6, 7A and 7B are flowcharts of processing steps that may be performed in an embodiment in accordance with techniques herein.

Referring to FIG. 4, shown is a first flowchart 200 of processing steps that may be performed in an embodiment in accordance with techniques herein. The flowchart 200 may denote steps performed to exchange information between the source data storage system 120 and target system 122 in order to perform the migration process. At step 202, the target system, as the initiator of the command and as the system controlling the migration process, may send a command to the source data storage system 120 inquiring whether the source system 120 support any one or more of the two modes of operation for use in connection with the migration processing. The command sent in step 202 may be, for example, a vendor unique SCSI log sense command. From step 202, control proceeds to step 204 where the source system returns a response to the command received (as sent in step 202 by the target system). The response may indicate what one or more of the modes, if any, are supported by the source system. Consistent with discussion herein, if the first mode is supported by the source data storage system 120, the source system recognizes and supports received commands as described herein which request return of a bitmap (e.g., zeroes bitmap) for a logical address range identifying what portions of the range are unused data portions (e.g., storing zero data value or content). In a similar manner, if the target system supports the first mode, the target system is capable of issuing such commands to the source system that request bitmaps denoting unused data portions, and the target system is capable of performed processing as described herein using the received bitmaps denoting unused data portions. If the second mode is supported by the source system 120, the source system performs special processing as described herein for unused data portions in response to receiving a read which specifies a logical address range of an unused data portion (e.g., that is all zeroes). Responsive to such a read, the source system returns a zero data length payload (no read data returned) and also returns a specialized check condition to the target system condition indicating to the target system that the logical address range of the read an unused data portion (e.g., all zeroes). In step 204, the response from the source system may indicate, for example, that the source system supports the first mode only, the second mode only, or both the first and the second modes.

From step 204, control proceeds to step 206 where the target system obtains the size of a source system track. In at least one embodiment, the size of a track may vary with data storage system and software/firmware thereon. For example, in at least one embodiment of the source system, the size of a source system track may be 64K bytes, and in another embodiment, the size of a source system track may be 128K bytes. The track may denote the size of a logical address unit or logical block of a logical device or LUN as described herein and may be used by the target system, for example, when determining required size of buffers, amount of data transferred, size of read and/or write data payload, and the like.

From step 206, control proceeds to step 208 where the target system sends to the source system a command, such as a vendor unique SCSI log select command, notifying the source system as to whether the target system supports the specialized check condition as used in connection with the second mode of operation described herein.

Figure 5:
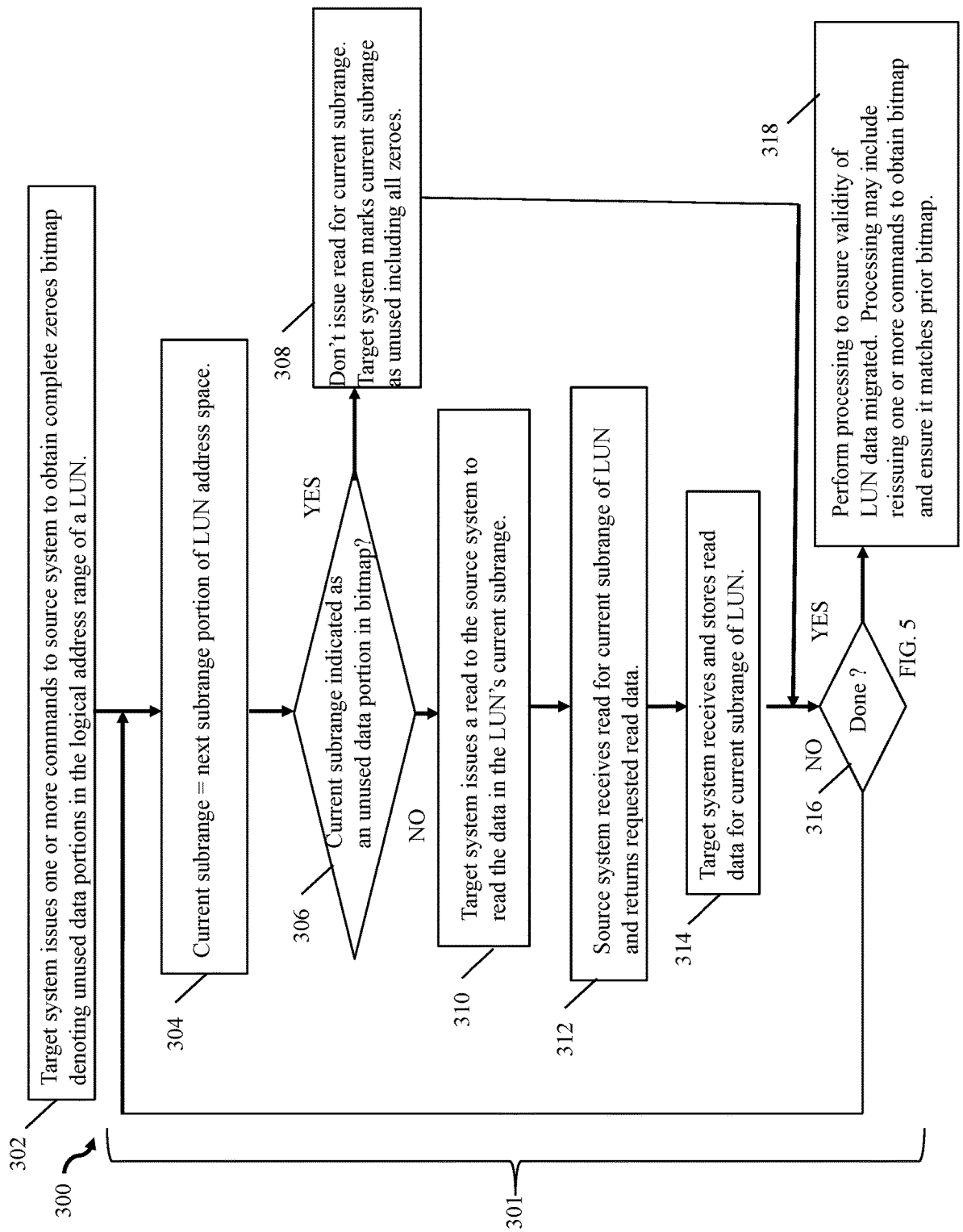

Referring to FIG. 5, shown is a flowchart of processing that may be performed in an embodiment in accordance with techniques herein where the first mode is supported on the source and target data storage systems. Processing of flowchart 300 make use of functionality of the first mode of operation using the bitmap denoting unused data portions without using the specialized check condition and zero length returned read payload of the second mode. The steps of flowchart 300 may be performed subsequent to performing the processing of FIG. 4. Additionally, flowchart 300 denotes processing performed for a single LUN being migrated, such as LUN A 130 of the source system, and may be repeated for each LUN being migrated from the source system 120 to the target system 122.

At step 302, the target system issues one or more commands, such as vendor unique SCSI commands, to the source system to obtain a complete zeroes bitmap denoting unused data portions in the logical address range of a LUN. Step 302 may include issuing multiple commands each requesting a zeroes bitmap for a different subrange of the logical address range of a LUN. Collectively, the multiple commands should provide a complete bitmap for the entire logical address range of the LUN. From step 302, control proceeds to step 304 where the current subrange is assigned the next subrange portion of the LUN address space. From step 304, control proceeds to step 306 where a determination is made on the source system as to whether the current subrange is indicated as an unused data portion in the bitmap information obtained as a result of step 302. If step 306 evaluates to yes, control proceeds to step 308 where the target system does not issue a read for the current subrange LUN data. Rather, in step 308, the target system marks the current subrange as unused including the predetermined pattern or value, such as all zeroes. From step 308, control proceeds to step 316.

If step 306 evaluates to no, control proceeds to step 310 where the target system issues a read to the source system to read the data in the LUNs current subrange. From step 310, control proceeds to step 312 where the source system receives the read sent in step 310 and returns the requested read data. From step 312, control proceeds to step 314 where the target system receives the read data (as sent by the source system in step 312) for the current subrange of the LUN. In step 314, the target system may then store the received read data at the LUN's current subrange on the target instance of the LUN (e.g., LUN A 130"). From step 314, control proceeds to step 316.

At step 316, a determination is made as to whether the entire logical address space of the LUN has been traversed whereby all data of the LUN has been migrated from the source to the target system. If step 316 evaluates to no, control proceeds to step 304 to migrate the next subrange portion of the LUN from the source system to the target system. If step 316 evaluates to yes, control proceeds to step 318 where processing may be performed to ensure and check the validity of the LUN data migrated. In at least one embodiment, step 318 may include reissuing one or more commands from the target to the source system to obtain the bitmap for the LUN denoting unused data portions of the LUN's logical address space. Step 318 may include the target system ensuring that the bitmap obtained in step 318 matches that previously obtained in step 302.

Generally, the flowchart 300 beginning with step 304 migrates a portion of the LUN's address space denoting by current subrange in a single loop iteration (Loop 301). In at least one embodiment, each iteration of the loop 301 traverses a next sequential consecutive portion of the LUN's logical address space and migrates data for that portion of the LUN's logical address space.

Figure 6:
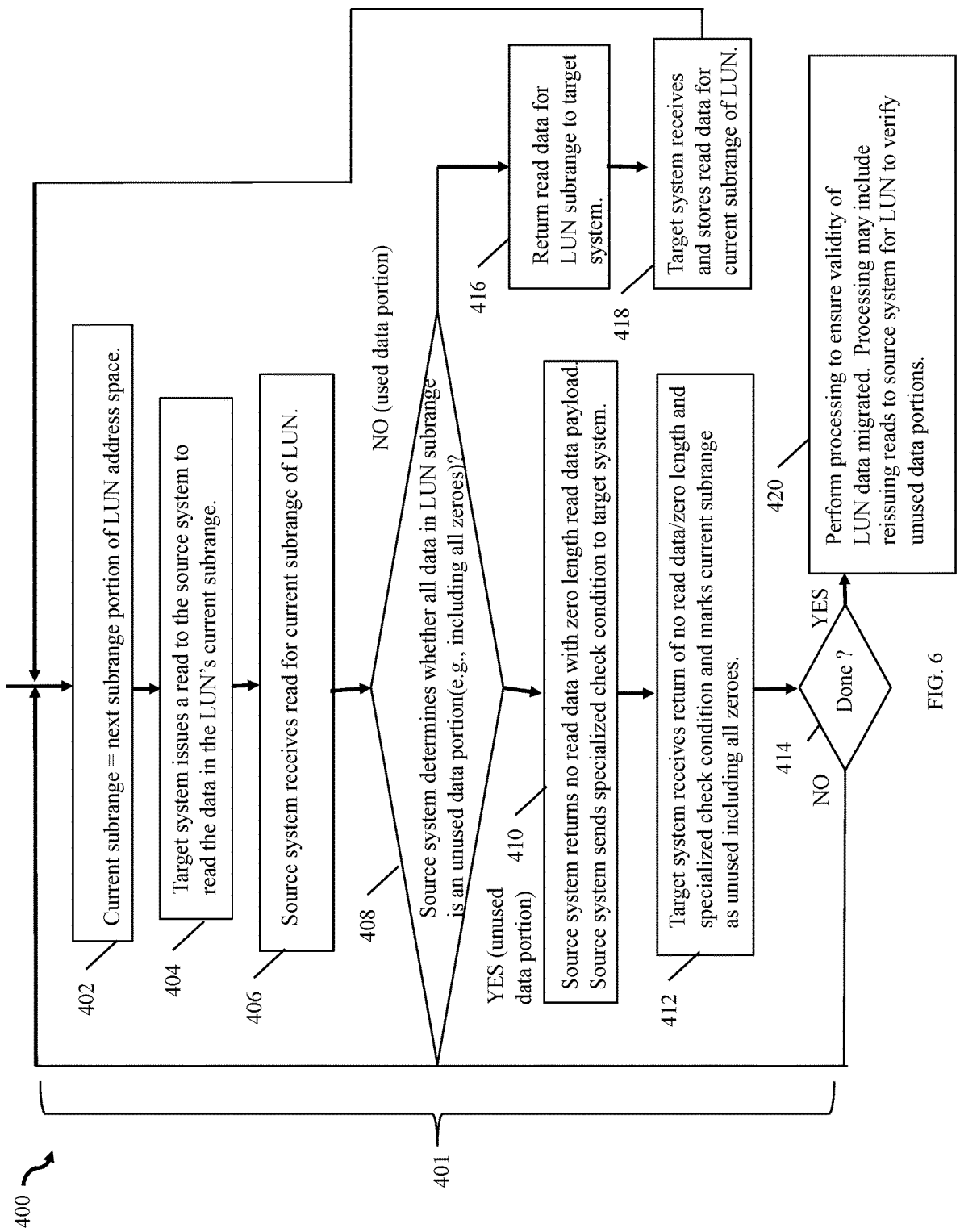

Referring to FIG. 6, shown is a flowchart of processing that may be performed in an embodiment in accordance with techniques herein where the second mode is supported on the source and target data storage systems. Processing of flowchart 400 make use of functionality of the second mode of operation using the specialized check condition and zero length returned read payload of the second mode (e.g., without having the target system request and use the bitmap denoting unused data portions). The steps of flowchart 400 may be performed subsequent to performing the processing of FIG. 4. Additionally, flowchart 400 denotes processing performed for a single LUN being migrated, such as LUN A 130 of the source system, and may be repeated for each LUN being migrated from the source system 120 to the target system 122.

In a manner similar to that as described above, processing of FIG. 6 includes a loop 401 where each iteration of the loop 401 traverses a next sequential consecutive portion of the LUN's logical address space and migrates data for that portion of the LUN's logical address space.

At step 402, current subrange is assigned the next subrange portion of the LUN's logical address space. From step 402, control proceeds to step 404 where the target system issues a read to the source system to read the data in the LUN's current subrange. From step 404, control proceeds to step 406 where the source system receives the read as sent from the target system in step 404. From step 406, control proceeds to step 408 where the source system determines whether the entire LUN subrange of the read command is an unused data portion. For example step 406 may determine whether all zeroes are stored in the entire LUN subrange specified in the read command. If step 408 evaluates to no (e.g., LUN subrange does not denote an entire unused data portion whereby at least part of the LUN subrange has been written to by a host and does not contain the predetermined pattern or value of zeroes), control proceeds to step 416 where the source system returns the read data for the LUN subrange to the target system. From step 416, control proceeds to step 418 where the target system receives the requested read data and stores the read data for the current subrange of the LUN on the target instance of the LUN (e.g., LUN A 130") on the target system. From step 418, control proceeds to step 402.

If step 408 evaluates to yes (e.g., the LUN subrange denotes an unused data portion), control proceeds to step 410 where the source system returns a response to the read received in step 406 with no read data/zero length read data payload. Additionally, the source system sends a specialized check condition to the target system denoting that the LUN subrange of the read command (received in step 406) is an unused data portion (e.g., including all zeroes or other predetermined pattern or value denoting an unused data portion). From step 410, control proceeds to step 412 where the target system receives the read response with no read data payload and also receives the specialized check condition. Accordingly, the target system marks the current subrange of the target instance of the LUN (e.g., LUN A 130") as unused and including all zeroes. From step 412, control proceeds to step 414.

At step 414, a determination is made as to whether the entire logical address space of the LUN has been traversed whereby all data of the LUN has been migrated from the source to the target system. If step 414 evaluates to no, control proceeds to step 402 to migrate the next subrange portion of the LUN from the source system to the target system. If step 414 evaluates to yes, control proceeds to step 420 where processing may be performed to ensure and check the validity of the LUN data migrated. In at least one embodiment, step 420 may include reissuing read commands to the source system for the LUN to verify that the previously issued read commands from step 404 return the same read data and also result in the same unused data portions resulting in a specialized check condition returned from the source system.

Figure 7A:
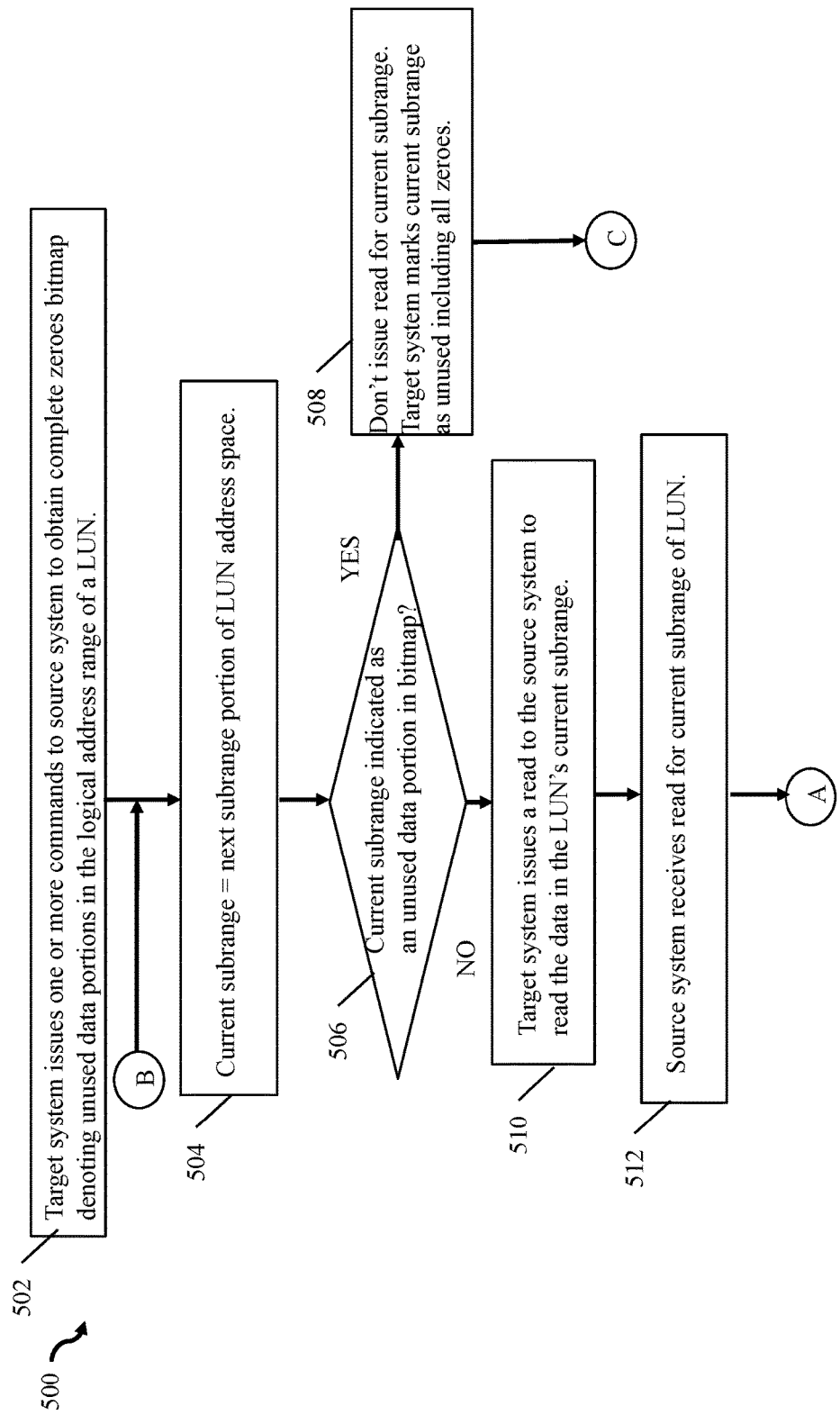
Figure 7B:
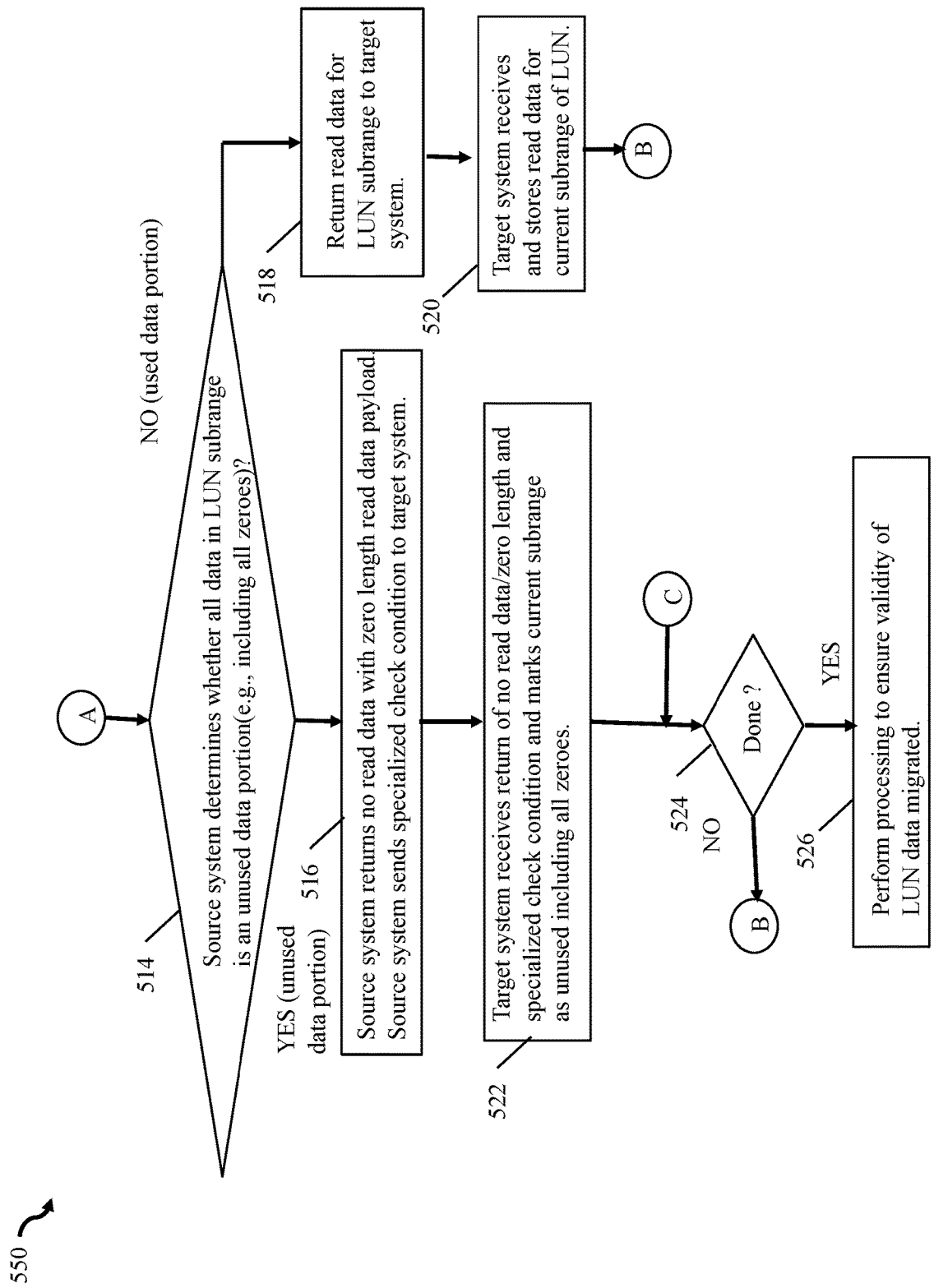

Referring to FIGS. 7A and 7B, shown are flowcharts of processing that may be performed in an embodiment in accordance with techniques herein where both the first mode and the second mode are supported on the source and target data storage systems. Processing of flowcharts 500 and 550 make use of functionality of both the first mode (e.g., where the target system requests and uses the bitmap denoting unused data portions) and the second mode (e.g., using the specialized check condition and zero length returned read payload) of operation described herein. The steps of flowcharts 500 and 550 may be performed subsequent to performing the processing of FIG. 4. Additionally, flowcharts 500 and 550 denote processing performed for a single LUN being migrated, such as LUN A 130 of the source system, and may be repeated for each LUN being migrated from the source system 120 to the target system 122.

At step 502, the target system issues one or more commands to the source system to obtain a complete zeroes bitmap denoting unused data portions in the logical address range of the LUN being migrated. Steps 502 is similar to step 301 of FIG. 5. From step 502, control proceeds to step 504 where current subrange is assigned the next subrange portion of the LUN's address space. Step 504 is similar to step 304 of FIG. 5. From step 504, control proceeds to step 506 where a determination is made on the target system as to whether the current subrange is indicates as an unused data portion in the bitmap for the LUN (e.g., as obtained in step 502). Step 506 is similar to step 306 of FIG. 5. If step 506 evaluates to yes, control proceeds to step 508 where the target system does not issue a read for the current subrange. Rather in step 508 the target system marks the current subrange in the target instance of the LUN as stored on the target system as unused and including all zeroes. Step 508 is similar to step 308 of FIG. 5. From step 508 control proceeds to step 524 of FIG. 7B.

If step 506 evaluates to no, control proceeds to step 510 where the target system issues a read to the source system to read the data in the LUN's current subrange. Step 510 is similar to step 310 of FIG. 5. From step 510, control proceeds to step 512 where the source system receives the read for the current subrange of the LUN. Step 512 is similar to step 406 of FIG. 6. From step 512, control proceeds to step 514. At step 514, a determination is made by the source system as to whether all the data in the LUN subrange is an unused data portion (e.g., includes all zeroes). Step 514 is similar to step 408 of FIG. 6. If step 514 evaluates to no, control proceeds to step 518 where the source system returns the read data for the LUN subrange to the storage system and control proceeds to step 520. At step 520, the target system receives and stores the requested read data for the current subrange of the LUN. Steps 518 and 520 are respectively similar to steps 416 and 418 of FIG. 6. From step 520, control proceeds to step 504.

If step 514 evaluates to yes, control proceeds to step 516 where the source system returns no read data with a zero length read data payload. Also step 516 includes the source system sending a specialized check condition to the target system denoting that the requested read data for the current subrange of the LUN is an unused data portion (e.g., includes all zeroes). Step 516 is similar to step 410 of FIG. 6. From step 516, control proceeds to step 522 where the target system receives the return read response of no read data with a zero length read data payload and also receives the specialized check condition. In step 522, the target system marks the current subrange of the LUN as unused including all zeroes. Step 522 is similar to step 412 of FIG. 6. From step 522, control proceeds to step 524 where a determination is made as to whether processing or migrating of the LUN is complete. Step 524 is similar to step 414 of FIG. 6 and also step 316 of FIG. 5. If step 524 evaluates to yes, control proceeds to step 526 where processing may be performed to ensure the validity of the LUN data migrated. Step 526 may include processing similar to step 318 of FIG. 5 and/or step 420 of FIG. 6. If step 524 evaluates to no, control proceeds to step 504.

In at least one embodiment, the source system may support the first mode in which the source system recognizes and performs processing of the command requesting bitmaps for specified logical addresses if the source system is able to efficiently compose such a bitmap denoting unused data portions.

In both source and target systems, logical addresses of unused data portions including all zeroes may be denoted using any suitable technique. For example, to determine whether a logical address subrange of a LUN is an unused data portions, a first technique may be used where a data storage system may have an indication such as stored in metadata of the LUN as to whether data was ever written to logical address subrange. In this case with the first technique, the data storage system may be able to determine unused data portions using only associated metadata without actually reading and inspecting the data from the logical address subrange (e.g., as stored on the physical storage device). If zero data values were actually written to the logical address subrange of the LUN, the storage system may have other means using a second technique by which an implied data value of zeroes are stored at the subrange. Such other means may, for example, using the second techniques to store information in the metadata associated with the subrange to indicate that a data values of zeroes has been written to the subrange without actually writing zeroes to the physical storage provisioned for the subrange of the LUN. As another example, rather than use either the foregoing first or second technique, a third technique may be used where the data storage system may actually store or write out zeroes as data contents/values to the physical storage provisioned for the subrange of the LUN. In this manner, the target system may mark unused data portions on a target instance of a LUN, such as LUN A 130", using any suitable technique some of which are described above (e.g., may mark unused data portions or data portions containing zeroes having associated logical addresses by storing an indicator in metadata of the LUN without writing actual data values of zeroes to the logical addresses, or may actually write out data values of zeroes to the logical addresses of the unused data portion or data portions containing zeroes).

In connection with processing as described herein, such as in step 514 of FIG. 7B and 408 of FIG. 6, the source system may determine that a specified logical address range/subrange does not denote an unused portion if the entire specified address range/subrange is not all zeroes (e.g., if any portion thereof has been written to or contains non-zero data, then the entire specified range/subrange of the read may be determined as a used data portion/not an unused data portion).

In connection with processing described above, such as in connection with step 522 of FIG. 7B and step 410 of FIG. 6 where the target system receives the specialized check condition denoting the unused data portion, the target system may also check whether there is an outstanding host command, such as outstanding read request, that requested data stored at a logical address of the unused data portion's logical address subrange. If so, the target system may additionally return to the host zeroes as the data value stored at logical address.

Figure 8:
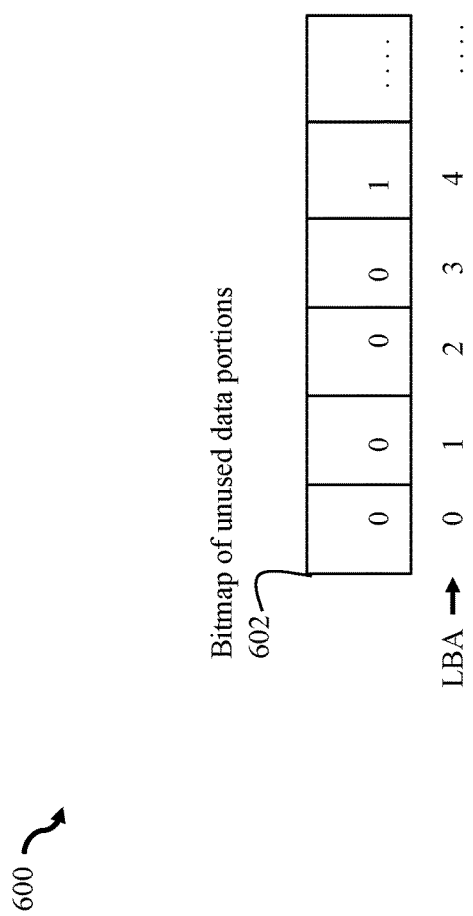
FIG. 8 is an example of a bitmap that may be used in an embodiment in connection with techniques herein to denote unused data portions of an address space of a logical device.

FIG. 8 is an example of a bitmap that may be used in an embodiment in connection with techniques herein to denote unused data portions of an address space of a logical device. The example 600 includes bitmap 200 such as may be created and used on the target system for a LUN having a corresponding logical address range of logical block addresses (LBAs). The bitmap 602 may be created by the target system as a result of issuing commands for bitmap information of unused data portions. The bitmap 602 in this example may be for a single LUN and may be generated as a result of issuing several commands requesting different bitmap portions for subranges of the LUN's logical address space. For example, assume LUN A is 30 blocks or tracks and thus has an associated LBA range of 0 through 29, inclusively. In connection with FIG. 5 processing in step 302, the target system may issue 3 commands for 3 different logical address subranges of the LUN. For example, a first command may request the bitmap denoting unused data portions for LBAs 0-9; the second command may request the bitmap denoting unused data portions for LBAs 10-19; and the third command may request the bitmap denoting unused data portions for LBAs 20-30. The bitmap 602 may denote the aggregate results of the bitmaps returned from the foregoing 3 commands. In the example 100, the bitmap 602 denotes an unused data portion at LBAs 0-3 of the LUN.

Techniques described herein provide efficient techniques that avoid sending unused data portions, such as those storing zero values, during data migration. Such techniques provide for consuming less bandwidth in connection with migrating data between the source and target systems and also provide for increased overall performance of the source and target systems (by reducing the resources required generally for the data migration).

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of migrating data comprising:
    obtaining, by a target system from a source system, a map indicating unused data portions stored at first logical addresses of a logical address range of a logical device, wherein data of the logical device is migrated from a source copy of the logical device on the source system to a target copy of the logical device on the target system, wherein the target system obtains the map prior to performing processing that migrates data from the source copy of the logical device to the target copy of the logical device, and wherein the map indicates the unused data portions in the source copy of the logical device prior to migrating any data from the source copy of the logical device to the target copy of the logical device;
    performing said processing that migrates data of the logical device from the source system to the target system, the processing including:
        issuing one or more read commands from the target system to the source system to read data from the source copy of the logical device, wherein the one or more read commands only read data from second logical addresses of the logical device that are not marked as unused data portions in accordance with the map;
        receiving the read data at the target system from the source system;
        responsive to receiving the read data stored at the second logical addresses of the logical device, writing the read data to the second logical addresses of the target copy of the logical device on the target system; and
        marking the first logical addresses indicated by the map as corresponding to the unused data portions in the target copy of the logical device.

2. The method of claim 1, wherein the map is a bitmap including a plurality of entries, wherein each of the plurality of entries corresponds to a different logical address of the logical device and includes a zero (0) if said each entry corresponds to a logical address of the logical device of an unused data portion and otherwise includes a one (1).

3. The method of claim 1, wherein unused data portions on the source copy of the logical device and on the target copy of the logical device are denoted by zeroes stored at logical address subranges of the logical address range, wherein the logical address subranges are associated with the unused data portions.

4. The method of claim 1, further comprising:
    sending, from the target system to the source system, a command inquiring whether the source system supports any one or more modes of migrating data from the source system to the target system; and
    responsive to receiving the command at the source system, sending a response to the target system identifying one or more supported modes of migrating data, if any, supported by the source system.

5. The method of claim 4, further comprising:
    sending from the target system to the source system a second command notifying the source system whether the target system supports a specialized error condition used in connection with one of the supported modes of migrating data.

6. The method of claim 1, wherein the target system does not issue reads to read data for the first logical addresses of the unused data portions and wherein said marking indicates that a predetermined pattern or value is stored at the first logical addresses.

7. The method of claim 6, wherein the predetermined pattern or value is zeroes stored at the first logical addresses.

8. The method of claim 1, further comprising:
    receiving, on the source system from the target system, the one or more read commands that read data from the source copy of the logical device;
    performing, by the source system, first processing for each of the one or more read commands, the first processing including:
        determining whether all data requested by said each read command is included in an unused data portion; and
        responsive to determining all data requested said each read command is included in an unused data portion, performing second processing by the source system including:
            returning, to the target system, a response to said each read command with no read data payload and an error condition indicating that a subrange of the logical address space read by said each read command is an unused data portion.

9. The method of claim 8, further comprising:
    responsive to determining all data requested by said each read command is not included in an unused data portion, returning, to the target system, a response to said each read command with a data payload of read data stored at a subrange of the logical address space read by said each read command.

10. A non-transitory computer readable medium comprising code stored thereon that, when executed, performs a method of migrating data comprising:
issuing a plurality of reads from the target system to the source system, wherein each of the plurality of reads reads data from a different subrange of a logical address space of a source copy of a logical device stored on the source system, wherein data of the logical device is migrated from a source copy of the logical device on the source system to a target copy of the logical device on the target system;
receiving, on the source system, the plurality of reads;
performing, by the source system, first processing for each of the plurality of reads comprising:
determining whether all data requested by said each read is included in an unused data portion; and
responsive to determining all data requested by said each read is included in an unused data portion, performing second processing by the source system including:
returning, to the target system, a response to said each read with no read data payload and a return value indicating that a subrange of the logical address space read by said each read is an unused data portion.

11. The non-transitory computer readable medium of claim 10, further comprising:
receiving, at the target system, the response to said each read; and
marking the subrange of the logical address space of said each read as an unused data portion.

12. The non-transitory computer readable medium of claim 10, where the method further includes:
responsive to determining all data requested by said each read is not included in an unused data portion, returning, to the target system, a response to said each read with a data payload of read data stored at a subrange of the logical address space read by said each read.

13. The non-transitory computer readable medium of claim 12, where the method further includes:
writing, at the target system, the read data to the subrange of the logical address space on the target copy of the logical device.

14. A system comprising:
one or more processors; and
one or more memories comprising code stored thereon that, when executed, performs a method of migrating data comprising:
obtaining, by a target system from a source system, a map indicating unused data portions stored at first logical addresses of a logical address range of a logical device, wherein data of the logical device is migrated from a source copy of the logical device on the source system to a target copy of the logical device on the target system, wherein the target system obtains the map prior to performing processing that migrates data from the source copy of the logical device to the target copy of the logical device, and wherein the map indicates the unused data portions in the source copy of the logical device prior to migrating any data from the source copy of the logical device to the target copy of the logical device;
performing said processing that migrates data of the logical device from the source system to the target system, the processing including:
issuing one or more read commands from the target system to the source system to read data from the source copy of the logical device, wherein the one or more read commands only read data from second logical addresses of the logical device that are not marked as unused data portions in accordance with the map;
receiving the read data at the target system from the source system;
responsive to receiving the read data stored at the second logical addresses of the logical device, writing the read data to the second logical addresses of the target copy of the logical device on the target system; and
marking the first logical addresses indicated by the map as corresponding to the unused data portions in the target copy of the logical device.

15. The system of claim 14, wherein the map is a bitmap including a plurality of entries, wherein each of the plurality of entries corresponds to a different logical address of the logical device and includes a zero (0) if said each entry corresponds to a logical address of the logical device of an unused data portion and otherwise includes a one (1).

16. The system of claim 14, wherein unused data portions on the source copy of the logical device and on the target copy of the logical device are denoted by zeroes stored at logical address subranges of the logical address range, wherein the logical address subranges are associated with the unused data portions.

17. The system of claim 14, wherein the method further comprises:
sending, from the target system to the source system, a command inquiring whether the source system supports any one or more modes of migrating data from the source system to the target system; and
responsive to receiving the command at the source system, sending a response to the target system identifying one or more supported modes of migrating data, if any, supported by the source system.

18. The system of claim 17, wherein the method further comprises:
sending from the target system to the source system a second command notifying the source system whether the target system supports a specialized error condition used in connection with one of the supported modes of migrating data.

19. The system of claim 14, wherein the target system does not issue reads to read data for the first logical addresses of the unused data portions and wherein said marking indicates that a predetermined pattern or value is stored at the first logical addresses.

20. The system of claim 19, wherein the predetermined pattern or value is zeroes stored at the first logical addresses.

* * * * *